L. HENDERSON.
POTATO DIGGER.
No. 106,583.
Patented Aug. 23, 1870.
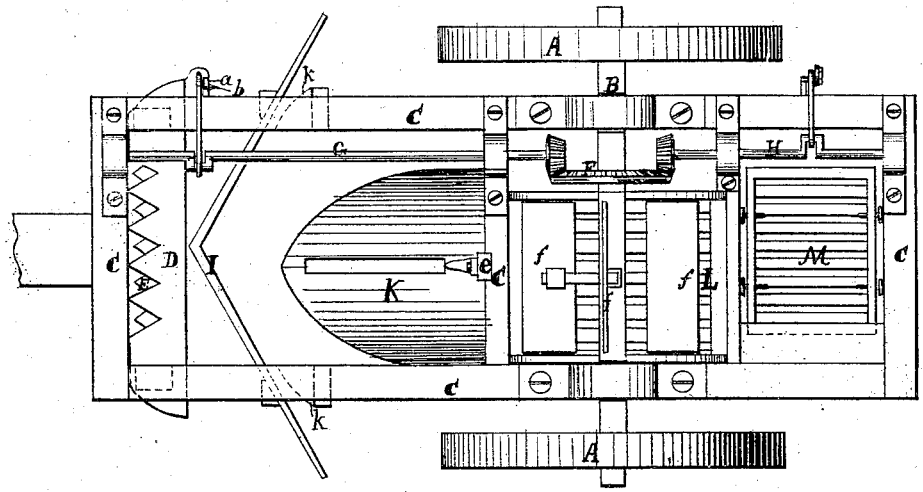
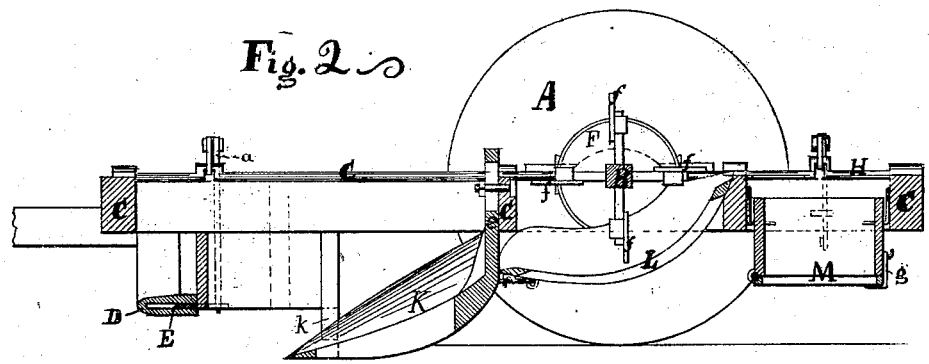
Witnesses:
V. C. Clayton
Jas. S. Ewbank
Inventor:
L. Henderson
by his attys
Jo. Clayton & Co.

UNITED STATES PATENT OFFICE.

LEONARD HENDERSON, OF MANSON, NORTH CAROLINA.

IMPROVEMENT IN POTATO-DIGGERS.

Specification forming part of Letters Patent No. 106,583, dated August 23, 1870.

*To all whom it may concern:*

Be it known that I, LEONARD HENDERSON, of Manson, in the county of Warren, and in the State of North Carolina, have invented certain new and useful Improvements in Potato-Diggers; and I do hereby declare that the following is a full, clear, and exact description thereof, reference being had to the accompanying drawings, and to the letters of reference marked thereon, in which—

Figure 1 is a plan view. Fig. 2 is a side elevation.

The nature of my invention consists in the use of reciprocating sickle-knives for cutting off the vines of the potatoes, and a scraper for clearing them from the row before the digger; also, of an adjustable digger and side plows, with an inclined slotted plane to carry up the potatoes by the revolving lifters, and deposit them in an oscillating perforated or slotted hopper or box to hold the potatoes, and to separate them from the dirt, and, when a sufficient quantity is gathered, to deposit them in heaps or fill them into bags, as will be hereinafter set forth and described.

To enable others skilled in the art to make and use my invention, I will proceed to describe its construction and operation.

In the construction of my invention, in Fig. 1, A A represent the ground-wheels; B, the axle; C C C, the frame of the machine, which is securely fastened to axle B; D, the cutter-bar, in which plays the knife E, with sickle-edge. The knife-bar is fastened securely to the frame at the front end by any suitable means.

On the axle B is securely fastened a gear-wheel, F, and on the top of the frame are two crank-rods, G and H, one in front and one in rear of the axle. The front rod is to give motion to the knife. A lever, $a$, is attached to the end of the knife, having its fulcrum on a bearing, $b$, attached to the arm of the knife-bar, and is connected with the crank G by connecting-rod $b$, and on its rear end is a pinion-wheel securely fastened, and which gears into a driving gear-wheel, F. The rod H has a similar pinion-wheel, gearing into the driving-wheel, with similar levers attached to the hopper which receives the potatoes, and to the crank H, for the purpose of oscillating the box or hopper.

I represents the scraper, which serves to push aside the tops after they have been cut, and to leave the row clear for the action of the plows $k$ and the adjustable digger K, and which has a slot in the center through which the earth can pass. This digger is attached to a standard, $e$, which is secured to the frame C by a bolt, which passes through a slot long enough to allow the digger to be raised or lowered, as may be required. In rear of the digger is placed a curved inclined plane, with slotted bottom L, and which is fastened by hinges to the digger in front, and at the rear is fastened, by a hinge or otherwise, to one of the cross-pieces of the frame C, and is also adjustable with the digger. Revolving in this trough (as it has sides) are four scrapers, $f f f f$, which carry the potatoes up the plane, while the earth, falling through the slots in the bottom, causes them to fall over into the oscillating hopper or box M, where they are retained for some time. By shaking the hopper the earth is separated from the potatoes, after which the bottom is let fall down, by detaching the hook or cleat $g$, and the potatoes are regularly laid in heaps.

In Fig. 2 like parts are designated by the same letters.

In the operation of my invention, as constructed, the wheels A straddle the potato-row, and, as the machine moves forward, vibration is given to the knife, which runs close to the ground, and cuts off the tops. They then come in contact with scraper I, by which they are pushed to the sides of the machine, leaving the row clear of any obstruction. The plows $k\ k$ cut off the sides of the row close to the potatoes, and turn the earth off from the row—say a furrow of any required size. The digger then enters the row and scoops up the potatoes, allowing the earth to pass through the slot in the center of the same. The potatoes are then carried up into the trough or inclined plane, and, by means of the revolving scrapers or elevators, are raised up to the end of the trough. They then fall into the vibrating receptacle, where they are kept until a required quantity is gathered, and the earth separated from the potatoes, when they are emptied by detaching the bottom, and the potatoes are left in heaps; or they can be filled into bags from the receptacle.

Having thus fully described the construction and operation of my invention, what I claim as new, and desire by Letters Patent, is—

1. The arrangement of the vibrating knife E, serrated guard D, clearers I I, arranged in reference to the digger K, constructed and operating as described, and for the purposes set forth.

2. The combination of the adjustable slotted digger K between the side plows, h k, the inclined or curved dirt-trough L, elevating-reel f, and vibrating hopper M, operated by mechanism connected with the axle of the main wheel A, when the parts are constructed as herein described and set forth.

In testimony that I claim the above-described certain new and useful "improvements in potato-diggers" I have hereunto signed my name this 7th day of August, 1868.

L. HENDERSON.

Witnesses:
 JOHN H. BULLOCK,
 T. G. CLAYTON.